United States Patent
Wang et al.

(10) Patent No.: US 10,670,784 B2
(45) Date of Patent: Jun. 2, 2020

(54) LIGHT FILTER STRUCTURE AND IMAGE SENSOR

(71) Applicant: VisEra Technologies Company Limited, Hsin-Chu (TW)

(72) Inventors: Wei-Ko Wang, Taoyuan (TW); Yu-Jen Chen, Taoyuan (TW); Chia-Hui Wu, Yunlin County (TW)

(73) Assignee: VISERA TECHNOLOGIES COMPANY LIMITED, Hsin-Chu (TW)

( * ) Notice: Subject to any disclaimer, the term of this patent is extended or adjusted under 35 U.S.C. 154(b) by 478 days.

(21) Appl. No.: 15/597,979

(22) Filed: May 17, 2017

(65) Prior Publication Data
US 2018/0335555 A1    Nov. 22, 2018

(51) Int. Cl.
| | |
|---|---|
| G02B 5/00 | (2006.01) |
| G01S 7/00 | (2006.01) |
| G02B 5/28 | (2006.01) |
| G02B 5/20 | (2006.01) |
| G01S 7/481 | (2006.01) |
| G01S 17/89 | (2020.01) |

(52) U.S. Cl.
CPC ............ G02B 5/281 (2013.01); G01S 7/4816 (2013.01); G01S 17/89 (2013.01); G02B 5/208 (2013.01)

(58) Field of Classification Search
USPC ....................................................... 356/5.01
See application file for complete search history.

(56) References Cited

U.S. PATENT DOCUMENTS

| | | | | |
|---|---|---|---|---|
| 9,618,666 | B2 * | 4/2017 | Kawashima | .......... C08K 5/0091 |
| 2012/0133799 | A1 * | 5/2012 | Findlay | .................. G01S 7/4816 |
| | | | | 348/241 |
| 2014/0138519 | A1 * | 5/2014 | Wang | ...................... G01S 17/89 |
| | | | | 250/206.1 |

(Continued)

FOREIGN PATENT DOCUMENTS

| | | |
|---|---|---|
| JP | 2016-146619 | 8/2016 |
| JP | 2016-162946 | 9/2016 |

(Continued)

OTHER PUBLICATIONS

Office Action of corresponding JP application No. 2017-155161 dated Sep. 4, 2018, 6 pages.

(Continued)

*Primary Examiner* — James R Hulka
(74) *Attorney, Agent, or Firm* — Muncy, Geissler, Olds & Lowe, P.C.

(57) ABSTRACT

A light filter structure is provided. The light filter structure includes a first filter layer disposed over the substrate. The first filter layer has a transmittance greater than 50% in a first waveband, wherein the first filter layer is an interference-type filter. The light filter structure further includes a second filter layer disposed over the substrate. The second filter layer has a transmittance greater than 50% in a second waveband, wherein the second filter layer is an absorption-type filter. The first waveband partially overlaps the second waveband at the wavelength in a third waveband, and the third waveband is in an IR region. Furthermore, an image sensor used as a time-of-flight image sensor is also provided.

20 Claims, 7 Drawing Sheets

(56) References Cited

U.S. PATENT DOCUMENTS

2015/0301245 A1    10/2015  Kawashima et al.
2015/0341619 A1*   11/2015  Meir .................... G01S 17/06
                                                    348/47
2016/0003946 A1*   1/2016   Gilliland ............. G01S 17/10
                                                    356/5.01

FOREIGN PATENT DOCUMENTS

| KR | 10-2016-0094299 | 8/2016 |
| TW | 201614819 | 4/2016 |
| WO | WO2016/117596 | 7/2016 |
| WO | WO2016/117597 | 7/2016 |

OTHER PUBLICATIONS

Office Action of corresponding TW application No. 106141151 dated Sep. 28, 2018, 5 pages.

* cited by examiner

LIGHT FILTER STRUCTURE AND IMAGE SENSOR

BACKGROUND

Field of the Invention

The invention relates to a light filter structure and more particularly to an image sensor for time-of-flight (ToF) technology application.

Description of the Related Art

Currently, time-of-flight (ToF) technology has been used extensively in modern industries to provide three-dimensional (3D) imaging by using a low-cost complementary metal-oxide semiconductor (CMOS) pixel array together with a modulated light source. 3D ToF cameras are used for many different applications; for example, profile inspection of manufactured goods, computer-aided design (CAD) verification, geographic surveying, and object imaging.

A 3D ToF camera works by illuminating the scene with a modulated light source, and observing the reflected light. The phase shift between the illumination and the reflection is measured and translated into the distance. Typically, the illumination is from a solid-state laser or a light-emitting diode (LED) operating in the near-infrared range of about 850 nm, invisible to the human eye. An image sensor designed to respond to the same spectrum of the modulated light source receives the light and converts the photonic energy into electrical current to obtain distance (depth) information of the scene.

In general, a filter is disposed in front of the image sensor to obtain a better signal-to-noise ratio (SNR) of the distance (depth) information. The conventional filter is usually fabricated using multi-film interference technology. When a large inclined incident light falls on a conventional filter, blue-shift always occurs at the conventional filter and causes the spectrum of the conventional filter to move into a lower wavelength band. Therefore, image sensors containing conventional filters require a telecentric lens with 0° or small chief ray angle (CRA) to overcome the blue-shift caused by large inclined incident light.

BRIEF SUMMARY

According to some embodiments, a light filter structure is provided. The light filter structure includes a first filter layer disposed over a substrate. The first filter layer has a transmittance greater than 50% in a first waveband, and the first filter layer is an interference-type filter. The light filter structure also includes a second filter layer disposed over the substrate. The second filter layer has a transmittance greater than 50% in a second waveband, and the second filter layer is an absorption-type filter. The first waveband partially overlaps the second waveband in a third waveband, and the third waveband is in an IR region.

According to some embodiments, an image sensor is provided. The image sensor includes a substrate having a photodiode. The image sensor includes a first filter layer disposed over a substrate. The first filter layer has a transmittance greater than 50% in a first waveband, and the first filter layer is an interference-type filter. The image sensor also includes a second filter layer disposed over the substrate. The second filter layer has a transmittance greater than 50% in a second waveband, and the second filter layer is an absorption-type filter. The image sensor further includes a concentrator element disposed over the substrate. The first waveband partially overlaps the second waveband at wavelength in a third waveband, and the third waveband is in an IR region, and the image sensor is used as a time-of-flight image sensor.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION

Figure 1A:
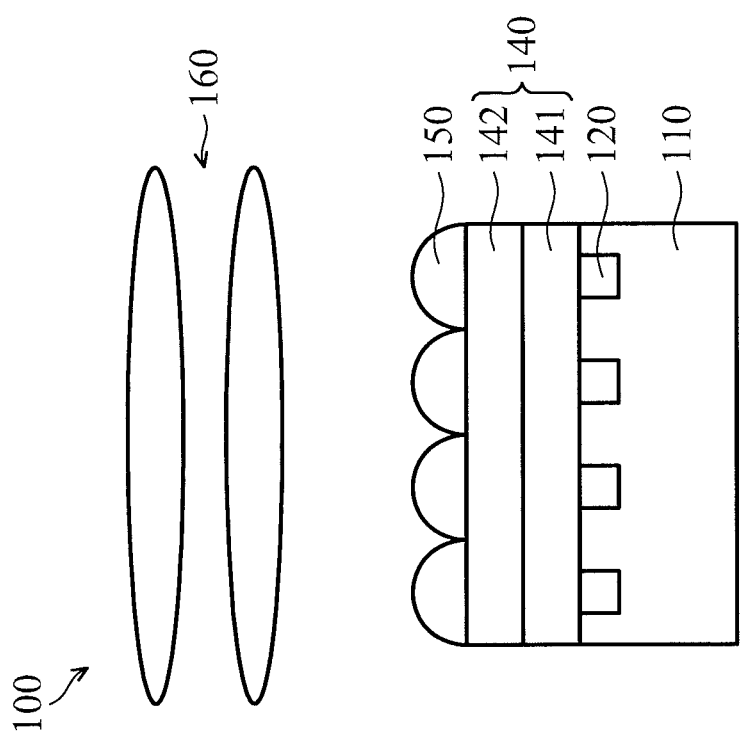
FIGS. 1A and 1B are cross-sectional views of an image sensor in accordance with some embodiments of the present disclosure.

The image sensor of the present disclosure is described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. In addition, in this specification, expressions such as "first material layer disposed on/over a second material layer", may indicate the direct contact of the first material layer and the second material layer, or it may indicate a non-contact state with one or more intermediate layers between the first material layer and the second material layer. In the above situation, the first material layer may not be in direct contact with the second material layer.

It should be noted that the elements or devices in the drawings of the present disclosure may be present in any form or configuration known to those skilled in the art. In addition, the expression "a layer overlying another layer", "a layer is disposed above another layer", "a layer is disposed on another layer" and "a layer is disposed over another layer" may indicate that the layer is in direct contact with the other layer, or that the layer is not in direct contact with the other layer, there being one or more intermediate layers disposed between the layer and the other layer.

In addition, in this specification, relative expressions are used. For example, "lower", "bottom", "higher" or "top" are used to describe the position of one element relative to another. It should be appreciated that if a device is flipped upside down, an element that is "lower" will become an element that is "higher".

The terms "about" and "substantially" typically mean+/−20% of the stated value, more typically +/−10% of the stated value, more typically +/−5% of the stated value, more typically +/−3% of the stated value, more typically +/−2% of the stated value, more typically +/−1% of the stated value and even more typically +/−0.5% of the stated value. The stated value of the present disclosure is an approximate value. When there is no specific description, the stated value includes the meaning of "about" or "substantially".

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another region, layer or section. Thus, a first element, component, region, layer, portion or section discussed below could be termed a second element, component, region, layer, portion or section without departing from the teachings of the present disclosure.

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

This description of the exemplary embodiments is intended to be read in connection with the accompanying drawings, which are to be considered part of the entire written description. The drawings are not drawn to scale. In addition, structures and devices are shown schematically in order to simplify the drawing.

In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Referring to FIG. 1A, a cross section of an image sensor 100 according to some embodiments is shown. As shown in FIG. 1A, the image sensor 100 includes a semiconductor substrate 110 containing a photodiode 120 formed therein. The substrate 110 may include, but is not limited to, a semiconductor substrate such as a silicon substrate. In addition, the substrate 110 may include an element semiconductor which may include germanium; a compound semiconductor which may include silicon carbide, gallium arsenide, gallium phosphide, indium phosphide, indium arsenide and/or indium antimonide; an alloy semiconductor which may include SiGe alloy, GaAsP alloy, AlInAs alloy, AlGaAs alloy, GaInAs alloy, GaInP alloy and/or GaInAsP alloy, or a combination thereof. In addition, the substrate 110 may include a semiconductor-on-insulator (SOI).

The photodiode 120 may disposed at such as a red (R) pixel, a green (G) pixel, a blue (B) pixel and an infrared (IR) pixel. The image sensor may be a front side image (FSI) sensor or a back side image (BSI) sensor.

The image sensor 100 further includes a wiring layer 130 formed on a surface of the substrate 110. In the image sensors 100, In order to simplify the diagram, the metal layers and the dielectric layers are not depicted in FIG. 1. In some embodiments, the image sensor 100 can be a CMOS image sensor (CIS) with IR pixels integrated together in a single image sensor.

In some embodiments, the image sensor 100 includes a light filter structure 140 disposed over the substrate 110. The light filter structure 140 includes a first filter layer 141 and a second filter layer 142 disposed over the first filter layer 141. In some embodiments, the first filter layer 141 is an interference-type filter, and the second filter layer 142 is an absorption-type filter. The first filter layer 141 may be a multi-film filter, and may be formed by a deposition process, an etching process and a lithography process. The second filter layer 142 may be a pigment filter made of organic films. The second filter layer 142 may be configured as a single filter or two or more filter layers. For example, the second filter layer 142 may be made of a red filter layer positioned under a blue filter layer.

The deposition process includes, but is not limited to, physical vapor deposition (PVD), chemical vapor deposition (CVD), sputtering, resistive thermal evaporation, electron beam evaporation, and any other applicable methods. The lithography process includes, but is not limited to, photoresist coating (e.g., spin-on coating), soft baking, mask alignment, exposure, post-exposure baking, developing the photoresist, rinsing and drying (e.g., hard baking). The lithography process may also be implemented or replaced by another proper method such as maskless photolithography, electron-beam writing or ion-beam writing. The etching process may include, but is not limited to, dry etching, wet etching, and other etching methods.

Figure 2:
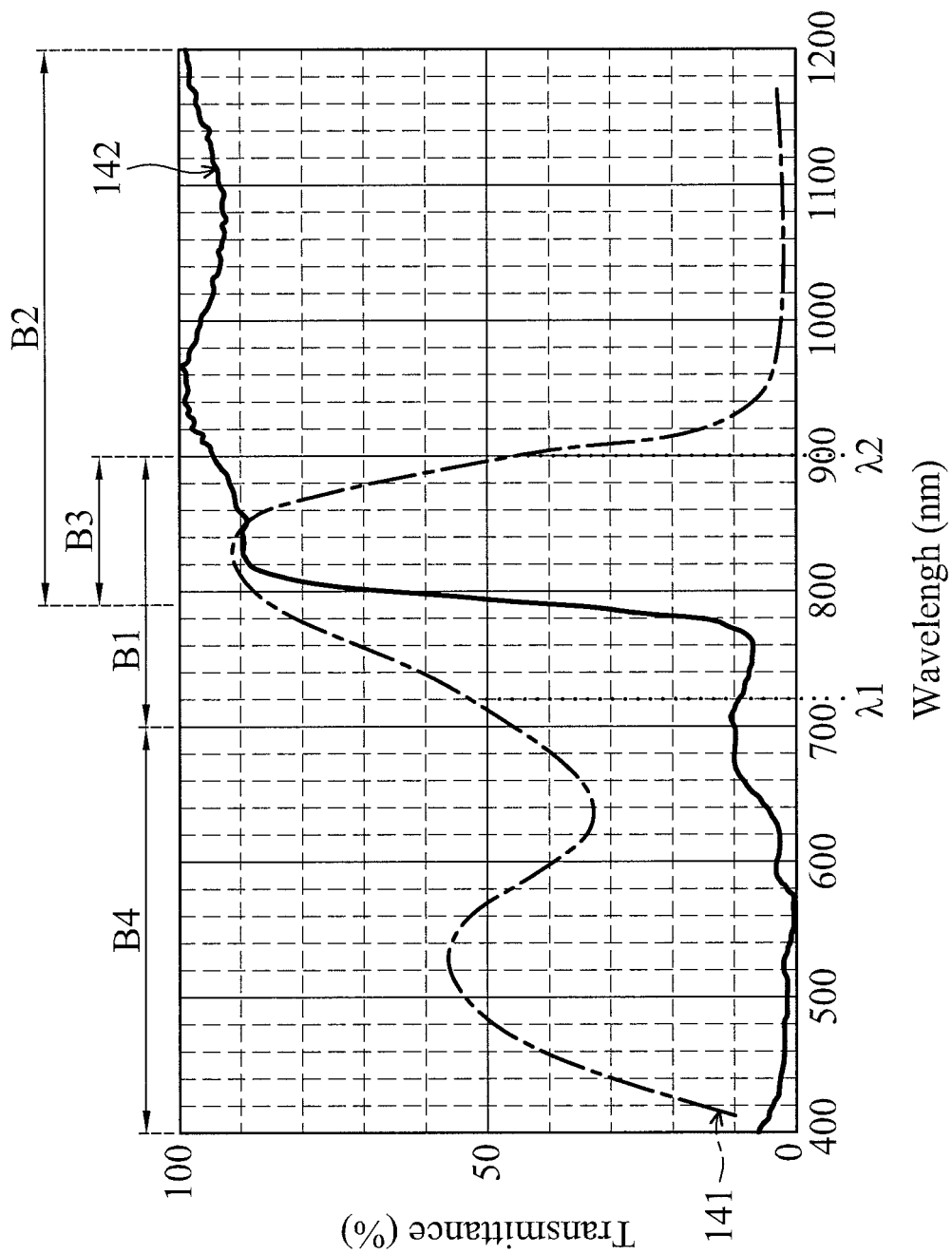
FIG. 2 is a graph of transmittance against wavelength to illustrate the optical characteristics of a first filter layer and a second filter layer of a light filter structure according to some embodiments.

Referring to FIG. 2, a graph of transmittance against wavelength to illustrate the optical characteristics of the first filter layer 141 and the second filter layer 142 of the light filter structure 140 according to some embodiments is shown. As shown in FIG. 2, the first filter layer 141 allows light with short wavelength to be transmitted through, and the second filter layer 142 allows light with long wavelength to be transmitted through. Moreover, the first filter layer 141 has a transmittance greater than 50% in a first waveband B1, and the second filter layer 142 has a transmittance greater than 50% in a second waveband B2.

As shown in FIG. 2, the first waveband B1 is between a first wavelength $\lambda_1$ and a second wavelength $\lambda_2$ higher than the first wavelength $\lambda_1$. In some embodiments, the second wavelength $\lambda_2$ is between 870 nm and 950 nm such as 900 nm. The first wavelength $\lambda_1$ is between about 400 nm and 820 nm such as 720 nm. The second waveband B2 is higher than about 800 nm.

As shown in FIG. 2, the first waveband B1 partially overlaps the second waveband B2 in a third waveband B3. The third waveband B3 is in an IR region. In some embodiments, the third waveband B3 is between 800 nm and 900 nm. In some embodiments, the image sensor 100 is used as a time-of-flight (ToF) image sensor, which detects light with wavelength in the IR region. Therefore, the image sensor 100 does not need to have a high transmittance band in the visible and near-infrared region. In other words, the first filter layer 141 is not necessary to optimize in the whole wavelength from 400 nm to 1100 nm, which includes visible light and near-infrared light. In some embodiments, the first filter layer 141 is designed to optimize the wavelength from 850 nm to 1100 nm. As shown in FIG. 2, the first filter layer 141 has light with wavelength of a fourth waveband B4 with transmittance smaller than 60%, and the fourth waveband B4 is between 400 nm and 700 nm. Since the first filter layer 141 is not optimized in the whole wavelength from 400 nm to 1100 nm, the thickness of the first filter layer 141 is reduced. In some embodiments, the thickness of the first filter layer 141 is smaller than 3 μm. In other embodiments, the thickness of the first filter layer 141 is smaller than 2 μm.

As shown in FIG. 2, the third waveband B3 is a narrow band, and the peak in the third waveband is at about 850 nm. In this embodiment, the light filter structure 140 consists of one interference-type filter (e.g., the first filter layer 141) and one absorption-type filter (e.g., second filter layer 142). Since the absorption-type filter is almost angle-independent, it reduces the blue-shift that occurs when using a multi-film interference-type filter. Moreover, the thickness of the interference-type filter is reduced. Therefore, the light filter structure 140 can reduce blue-shift while a large inclined incident light is irradiated onto the image sensors 100.

Turning back to FIG. 1A, the image sensor further 100 includes a microlens layer 150 and a lens module 160. As shown in FIG. 1A, the microlens layer 150 is disposed over the light filter structure 140, and the lens module 160 is disposed over the microlens layer 150. The microlens layer 150 is used as a concentrator element which increases light collection efficiency to the photodiode 120. The microlens layer 150 may be formed by the coating process, the lithography process and the etching process discussed above. The lens module 160 may include, but is not limited to, multiple lenses.

Figure 1B:
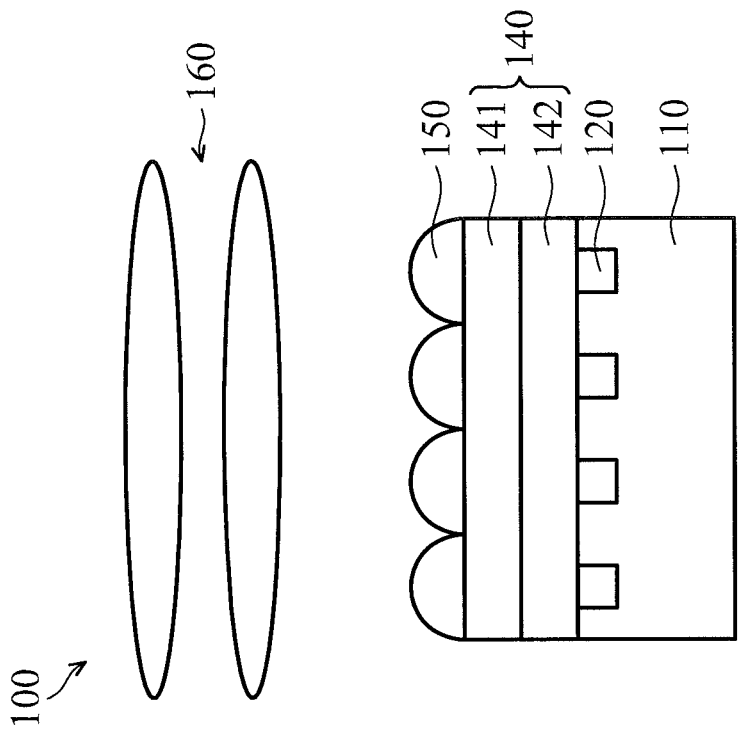

Referring to FIG. 1B, a cross section of an image sensor 100 according to some embodiments is shown. One of the differences between FIG. 1B and FIG. 1A is that the first filter layer 141 is disposed over the second filter layer 142. In this embodiment, the second filter layer 142 is indirect contact with the substrate 110, and the first filter layer 141 is disposed between the second filter layer 142 and the microlens layer 150.

Figure 3:
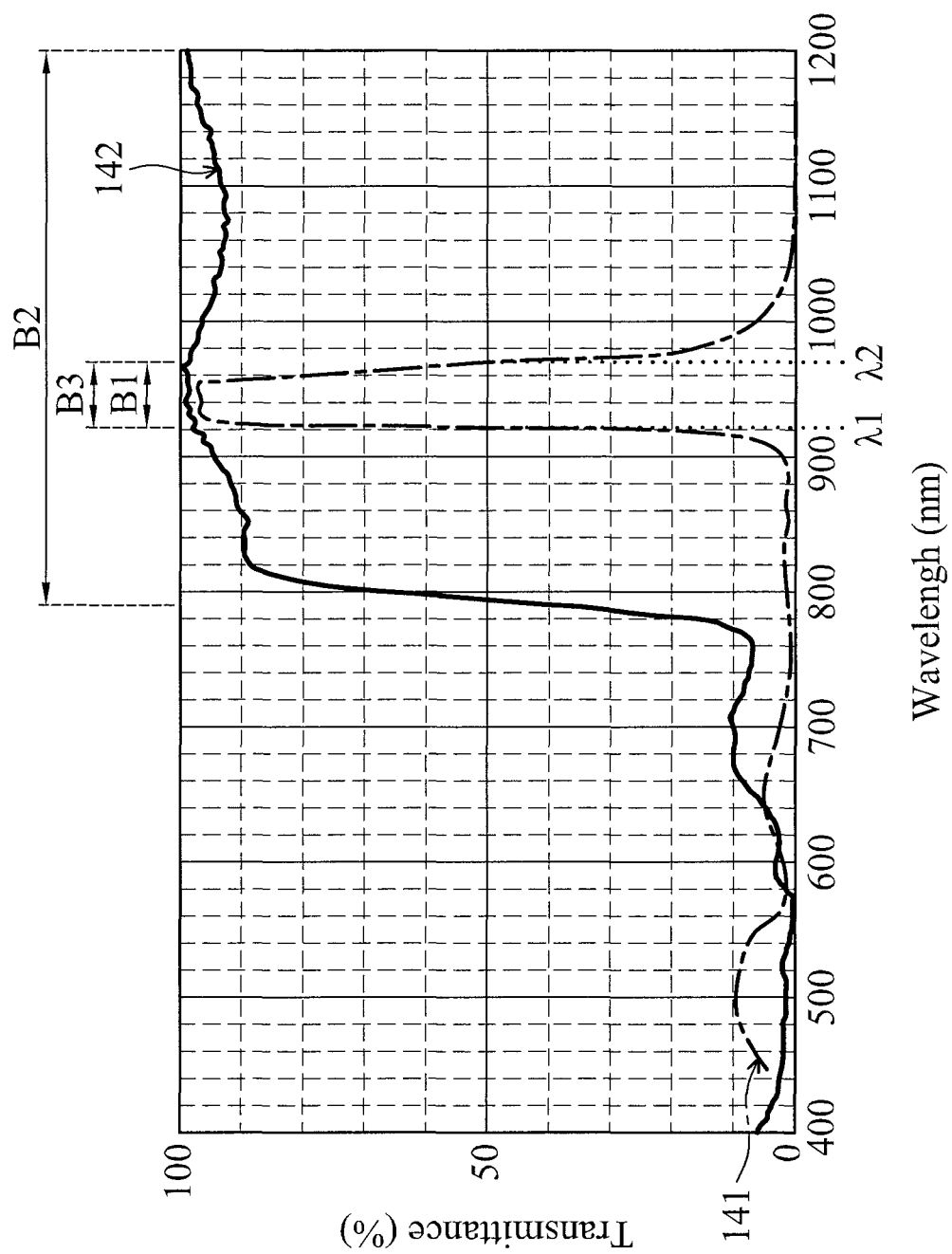
FIG. 3 is a graph of transmittance against wavelength to illustrate the optical characteristics of a first filter layer and a second filter layer of a light filter structure according to some embodiments.

Referring to FIG. 3, a graph of transmittance against wavelength to illustrate the optical characteristics of the first filter layer 141 and the second filter layer 142 of the light filter structure 140 according to some embodiments is shown. As shown in FIG. 3, the first waveband B1 is between a first wavelength $\lambda_1$ and a second wavelength $\lambda_2$ higher than the $\lambda_1$. In some embodiments, the second wavelength $\lambda_2$ is between about 960 nm and 1040 nm, such as 970 nm. The first wavelength $\lambda_1$ is between 400 nm and 910 nm. The second waveband B2 is higher than 800 nm. In this embodiment, the third waveband B3 is between about 910 nm and 970 nm, and the peak in the third waveband B3 is at about 940 nm. In this embodiment, the first filter layer 141 is designed to optimize wavelength from 940 nm to 1100 nm. Since it is not necessary to optimize the whole wavelength from 400 nm to 1100 nm, the thickness of the first filter layer 141 is reduced further.

Figure 4:
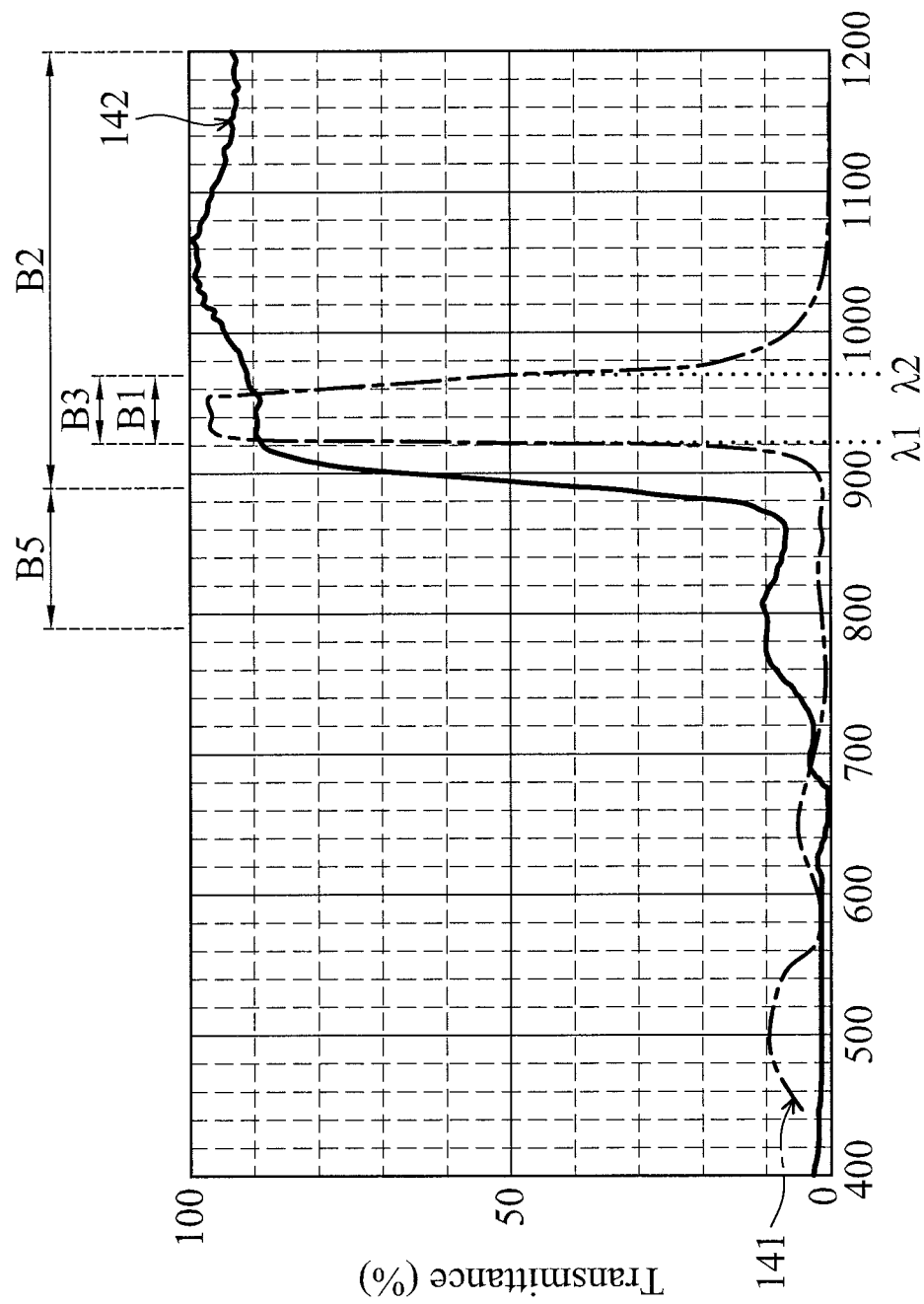
FIG. 4 is a graph of transmittance against wavelength to illustrate the optical characteristics of a first filter layer and a second filter layer of a light filter structure according to some embodiments.

Referring to FIG. 4, a graph of transmittance against wavelength to illustrate the optical characteristics of the first filter layer 141 and the second filter layer 142 of the light filter structure 140 according to some embodiments is shown. One of the differences between FIG. 4 and FIG. 3 is that the second waveband B2 is higher than about 900 nm. In this embodiment, since the third waveband B3 is designed to be in a range of 910 nm to 970 nm, it is not necessary to optimize the wavelength from 800 nm to 900 nm of the absorption-type filter such as second filter layer 142. As shown in FIG. 4, the second filter layer 142 has a transmittance smaller than 50% in a fifth waveband B5. In some embodiments, the fifth waveband B5 ranges from about 800 nm to 900 nm. As a result, the thickness of the second filter layer 142 is reduced. Therefore, the size of the image sensor 100 is reduced with a smaller light filter structure 140.

Figure 5A:
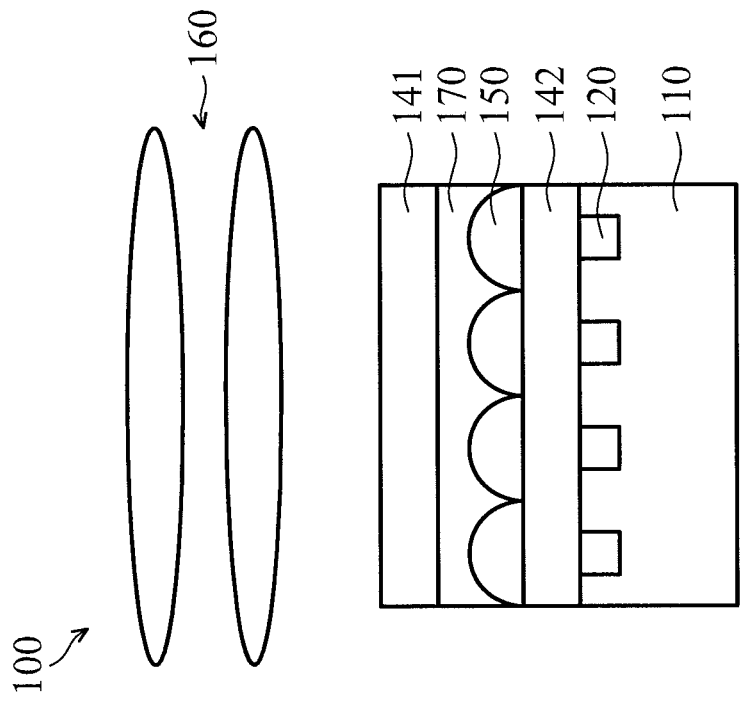
FIGS. 5A and 5B are cross-sectional views of an image sensor in accordance with some embodiments of the present disclosure.

Referring to FIG. 5A, a cross section of an image sensor 100 according to some embodiments is shown. The image sensor 100 further includes a spacer layer 170. The spacer layer 170 is disposed over the microlens layer 150, between the first filter layer 141 and the second filter layer 142. In some embodiments, the refractive index of the spacer layer 170 is smaller than the refractive index of the microlens layer 150. The spacer layer 170 may include, but is not limited to, phosphosilicate glass (PSG), borophosphosilicate glass (BPSG), low dielectric constant (low-k) dielectric material and other applicable dielectric materials. The low dielectric constant dielectric materials include, but are not limited to, fluorinated silica glass (FSG), carbon doped silicon oxide, amorphous fluorinated carbon, parylene, bis-benzocyclobutenes (BCB), polyimides, combinations of the above-mentioned materials, and other applicable materials. The spacer layer 170 may be formed by a chemical vapor deposition process. Examples of the chemical vapor deposition process may include, but are not limited to, low pressure chemical vapor deposition (LPCVD), low temperature chemical vapor deposition (LTCVD), rapid thermal chemical vapor deposition (RTCVD), plasma enhanced chemical vapor deposition (PECVD), atomic layer deposition (ALD), and any other applicable method. In this embodiment, a flat top surface of the spacer layer 170 is formed, and the second filter layer 142 is disposed on this flat surface and over the microlens layer 150. It provides more flexible manufacturing steps and methods to form the image sensor 100.

Figure 5B:
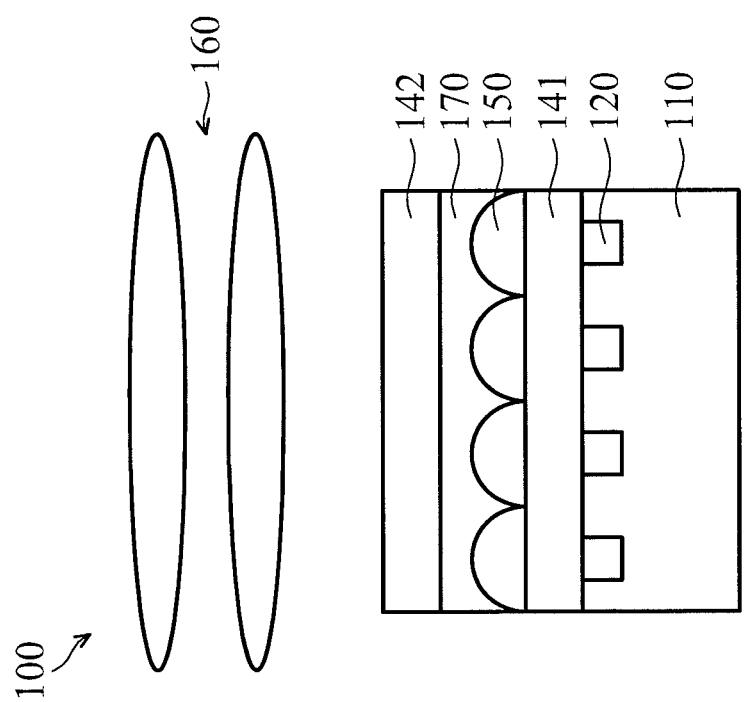

Referring to FIG. 5B, a cross section of an image sensor 100 according to some embodiments is shown. One of the differences between FIG. 5B and FIG. 5A is that the first filter layer 141 is disposed over the second filter layer 142. In this embodiment, the first filter layer 141 is disposed on a flat surface of the spacer layer 170 and over the microlens layer 160.

Figure 6A:
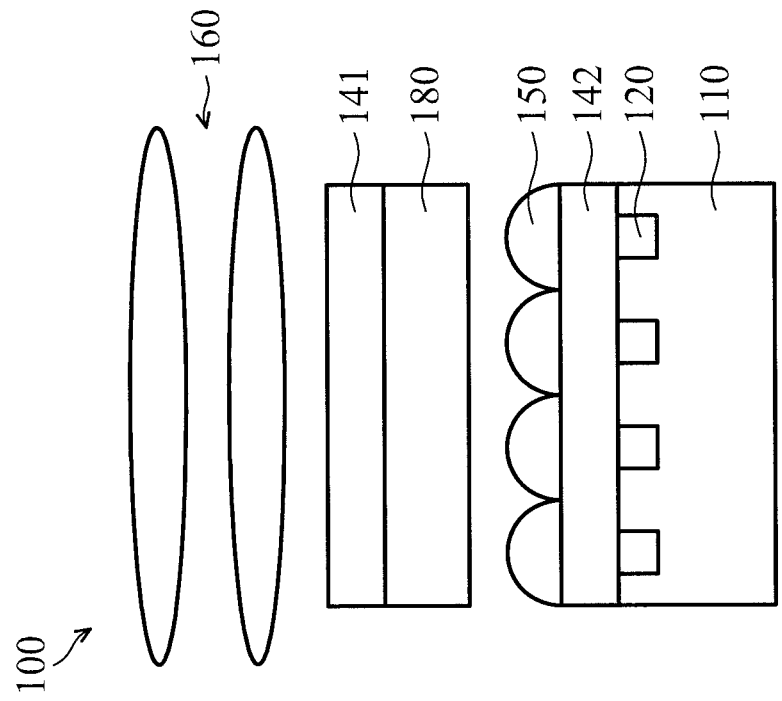
FIGS. 6A and 6B are cross-sectional views of an image sensor in accordance with some embodiments of the present disclosure.

Referring to FIG. 6A, a cross section of an image sensor 100 according to some embodiments is shown. In some embodiments, the image sensor 100 further includes a glass layer 180. The glass layer 180 is disposed over the microlens layer 150, between the first filter layer 141 and the second filter layer 142. In this embodiment, the second filter layer 142 is in direct contact with the glass layer 180. The image sensor 100 can be formed by integrating the substrate 110 with the first filter layer 141 and the glass layer 180 with the second filter layer 142. It provides more flexible manufacturing steps and methods to form the image sensor 100.

Figure 6B:
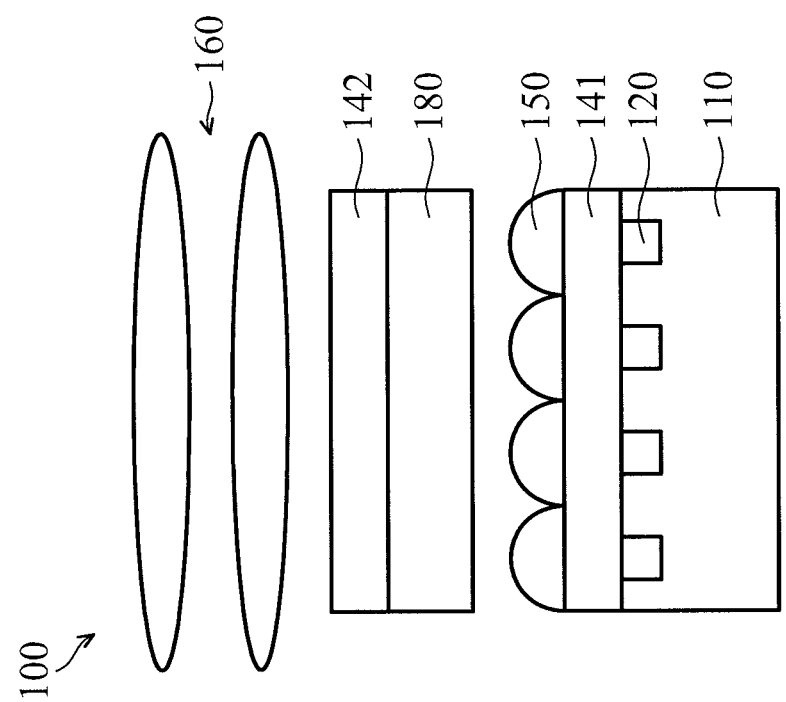

Referring to FIG. 6B, a cross section of an image sensor 100 according to some embodiments is shown. One of the differences between FIG. 6B and FIG. 6A is that the first filter layer 141 is disposed over the second filter layer 142. In this embodiment, the first filter layer 141 is disposed over the glass layer 180 and the microlens layer 150. Moreover, the first filter layer 141 is in direct contact with the glass layer 180. The image sensor 100 can be formed by integrating the substrate 110 with the second filter layer 142 and the glass layer 180 with first filter layer 141.

Figure 7:
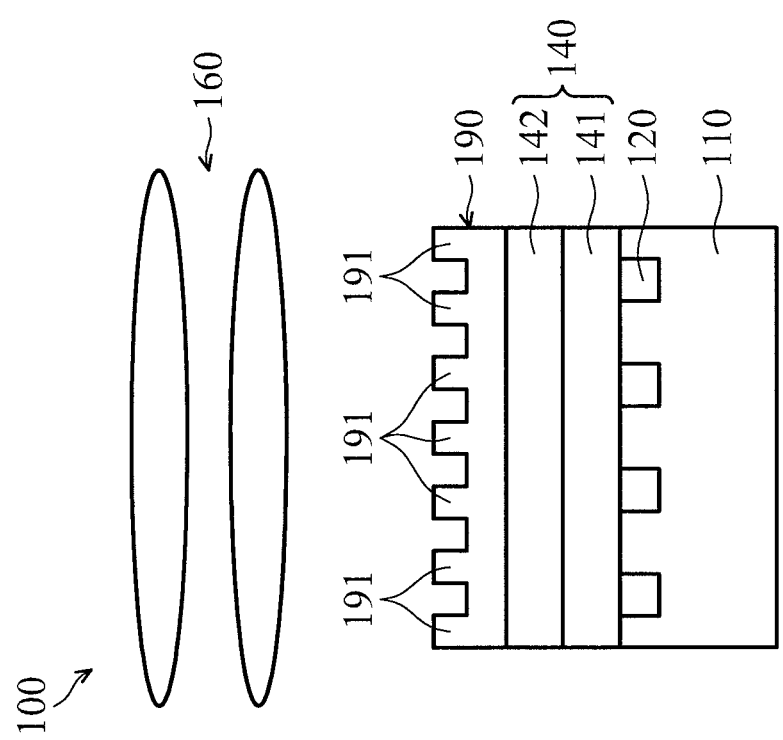
FIG. 7 is a cross-sectional views of an image sensor in accordance with some embodiments of the present disclosure.

Referring to FIG. 7, a cross section of an image sensor 100 according to some embodiments is shown. In some embodiments, the microlens layer 150 of the image sensor 100 is replaced by a Fresnel zone plate (FZP) 190. As shown in FIG. 7, the image sensor 100 includes the Fresnel zone plate 190 over the light filter structure 140. The Fresnel zone plate 190 can be used as a concentrator element to focus light. The operating principle of the Fresnel zone plate 190 is the diffraction of light. When Light hits the Fresnel zone plate 190, light will diffract and the diffracted light constructively interferes at the focal point. As a result, an image is created. As shown in FIG. 7, the Fresnel zone plate 190 is made of multiple rings 191, each of which has a different radius. From a top view, the Fresnel zone plate 190 consists of a set of radially symmetric rings 191. Compared to the microlens 150, the Fresnel zone plate 190 has lower height. Therefore, the size of the image sensor 100 can be reduced further by replacing the microlens layer 150 with the Fresnel zone plate 190.

In some embodiments, the microlens layer 150 shown in FIGS. 1A, 1B, 5A, 5B, 6A and 6B is replaced by the Fresnel zone plate 190, and thereby the size of the image sensor 100 is reduced.

According to the embodiments, the light filter structure consists of one interference-type filter allowing light with short wavelength to be transmitted through and one absorption-type filter allowing light with long wavelength to be transmitted through. Since the absorption-type is angle-independent, blue-shift is reduced. Moreover, since the image sensor such as the time-of-flight (ToF) is used to detect light with wavelength in IR region, it is not necessary to optimize wavelength in the visible light region and near-infrared light region. Therefore, the thickness of the interference-type is reduced, and thereby a smaller image sensor is formed.

While the disclosure has been described by way of example and in terms of the embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A light filter structure, comprising:
    a first filter layer disposed over a substrate, having a transmittance greater than 50% in a first waveband, wherein the first filter layer is an interference-type filter; and
    a second filter layer disposed over the substrate, having a transmittance greater than 50% in a second waveband, wherein the second filter layer is an absorption-type filter;
    wherein the first waveband partially overlaps the second waveband in a third waveband, and the third waveband is in an IR region.

2. The light filter structure as claimed in claim 1, wherein the third waveband is between 800 nm and 900 nm.

3. The light filter structure as claimed in claim 2, wherein the first waveband is between a first wavelength and a second wavelength that is higher than the first wavelength, the second wavelength is between 870 nm and 950 nm, and the second waveband is higher than 800 nm.

4. The light filter structure as claimed in claim 1, wherein the third waveband is between 910 nm and 970 nm.

5. The light filter structure as claimed in claim 4, wherein the first waveband is between a first wavelength and a second wavelength that is higher than the first wavelength, and the second wavelength is between 960 nm and 1040 nm.

6. The light filter structure as claimed in claim 5, wherein the second waveband is higher than 800 nm.

7. The light filter structure as claimed in claim 5, wherein the second waveband is higher than 900 nm.

8. The stacked filter as claimed in claim 1, wherein the first filter layer is disposed over the second filter layer.

9. The stacked filter as claimed in claim 1, wherein the second filter layer is disposed over the first filter layer.

10. The stacked filter as claimed in claim 1, wherein the first filter layer has a transmittance smaller than 60% in a fourth waveband, and the fourth waveband is between 400 nm and 700 nm.

11. An image sensor, comprising:
    a substrate having a photodiode;
    a first filter layer disposed over the substrate, having a transmittance greater than 50% in a first waveband, wherein the first filter layer is an interference-type filter;
    a second filter layer disposed over the substrate, having a transmittance greater than 50% in a second waveband, wherein the second filter layer is an absorption-type filter; and
    a concentrator element disposed over the substrate,
    wherein the first waveband partially overlaps the second waveband in a third waveband, the third waveband is in an IR region, and the image sensor is used as a time-of-flight image sensor.

12. The image sensor as claimed in claim 11, wherein the third waveband is between 800 nm and 900 nm.

13. The image sensor as claimed in claim 11, wherein the third waveband is between 910 nm and 970 nm.

14. The image sensor as claimed in claim 11, wherein the first filter layer has a transmittance smaller than 60% in a fourth waveband, and the fourth waveband is between 400 nm and 700 nm.

15. The image sensor as claimed in claim 11, further comprising:
    a space layer disposed over the concentrator element, wherein a refractive index of the spacer layer is smaller than a refractive index of the concentrator element.

16. The image sensor as claimed in claim 11, further comprising:
    a glass layer disposed over the concentrator element and between the first filter layer and the second filter layer.

17. The image sensor as claimed in claim 16, wherein one of the first layer and the second filter layer is in direct contact with the glass layer.

18. The image sensor as claimed in claim 11, wherein the concentrator element is made of a microlens layer or a Fresnel zone plate.

19. The image sensor as claimed in claim 11, wherein the second filter layer is disposed above the first filter layer.

20. The image sensor as claimed in claim 11, wherein the first filter layer is disposed over the second filter layer.

* * * * *